US008503977B2

(12) United States Patent  
Nakayama

(10) Patent No.: US 8,503,977 B2  
(45) Date of Patent: Aug. 6, 2013

(54) BILLING SYSTEM, BILLING-INFORMATION GENERATION APPARATUS, BILLING-INFORMATION GENERATION METHOD, COMPUTER READABLE RECORDING MEDIUM RECORDING BILLING INFORMATION GENERATION PROGRAM

(75) Inventor: Yukako Nakayama, Tokyo (JP)

(73) Assignee: NEC Corporation, Tokyo (JP)

( * ) Notice: Subject to any disclaimer, the term of this patent is extended or adjusted under 35 U.S.C. 154(b) by 887 days.

(21) Appl. No.: 12/551,916

(22) Filed: Sep. 1, 2009

(65) Prior Publication Data

US 2010/0087163 A1    Apr. 8, 2010

(30) Foreign Application Priority Data

Oct. 3, 2008    (JP) .................................. 2008-258521

(51) Int. Cl.
*H04M 11/00*    (2006.01)
*G06Q 40/00*    (2012.01)
*G06F 17/00*    (2006.01)

(52) U.S. Cl.
USPC ................ 455/406; 705/40; 705/52; 705/402

(58) Field of Classification Search
USPC ....................... 455/406; 705/40, 52, 402, 904
See application file for complete search history.

(56) References Cited

U.S. PATENT DOCUMENTS

| 7,068,606 B1* | 6/2006 | Ma et al. ........................ 370/236 |
| 7,424,283 B1* | 9/2008 | Mangal ........................... 455/406 |
| 2001/0023416 A1* | 9/2001 | Hosokawa ....................... 705/51 |
| 2004/0088183 A1* | 5/2004 | Nakanishi et al. ................. 705/1 |
| 2008/0032698 A1* | 2/2008 | Gerstenberger et al. ....... 455/450 |

FOREIGN PATENT DOCUMENTS

| JP | 2002368757 A | 12/2002 |
| JP | 2006086917 A | 3/2006 |
| JP | 2007086869 A | 4/2007 |
| JP | 2007529122 A | 10/2007 |
| JP | 2008104115 A | 5/2008 |
| WO | 0057666 A2 | 9/2000 |
| WO | 0139576 A1 | 6/2001 |
| WO | 2005034565 A1 | 4/2005 |

OTHER PUBLICATIONS

European Search Report for EP 09 16 7527 completed Mar. 17, 2010.
Japanese Office Action for JP2008-258521 mailed on Dec. 18, 2012.

* cited by examiner

*Primary Examiner* — George Eng
*Assistant Examiner* — Marcus Hammonds

(57) ABSTRACT

An information distribution apparatus creates data to be simultaneously distributed, further adding to the data an identifier which indicates that the data is distributed by a broadcast service, and adding billing class information in accordance with the data amount, and transmits it; a mobile terminal receives the data, creates a reception confirmation message if it is determined from the identifier added to the received data that the received data is distributed by a broadcast service, and further adds the identifier and the billing class information added to the data to the reception confirmation message to transmit it to a billing-information generation apparatus and the information distribution apparatus; and the billing-information generation apparatus generates billing information based on the billing class information added to the reception confirmation message if it is determined from the identifier added to the reception confirmation message that the data is distributed by a broadcast service.

6 Claims, 2 Drawing Sheets

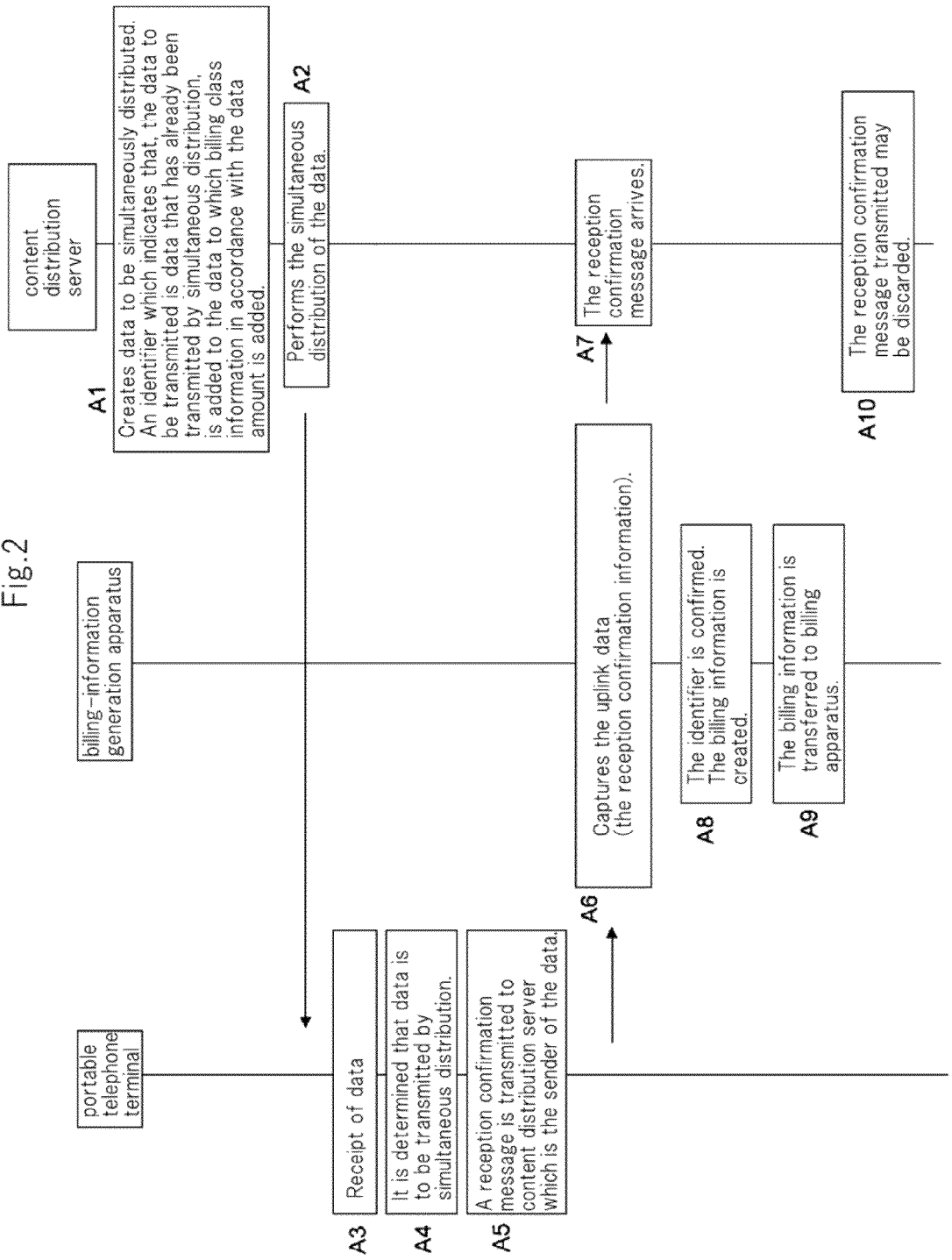

BILLING SYSTEM, BILLING-INFORMATION GENERATION APPARATUS, BILLING-INFORMATION GENERATION METHOD, COMPUTER READABLE RECORDING MEDIUM RECORDING BILLING INFORMATION GENERATION PROGRAM

This application is based upon and claims the benefit of priority from Japanese patent Application No. 2008-258521 filed on Oct. 3, 2008, the disclosure of which is incorporated herein in its entirety by reference.

BACKGROUND OF THE INVENTION

1. Field of the Invention

The present invention relates to a billing system, a billing-information generation apparatus, a billing-information generation method, and a computer readable recording medium which records a billing-information generation program.

2. Description of the Related Art

With the rapid spread of the Internet in recent years, the amount of data distributed over the network is rapidly increasing. To cope with this, IP (Internet Protocol) Multicast which can distribute the same data to a large number of unspecified users, so called multicast data, at one time is becoming widespread (see Japanese Patent Laid-Open No. 2002-368757).

In recent years, there is provided a same data simultaneous distribution service to portable telephone terminals utilizing Multicast which distributes the same data to a large number of unspecified terminals as described above. In simultaneous distribution services, communication carriers have been practicing monthly fixed-rate billings to subscribers (users) and the billing (of network usage charge) to content providers who offer Multicast services.

However, there is a problem with the billing method as described above in that the billing targets are limited. That is, even if a subscriber is subscribing to monthly fixed-rate distribution service, there is a possibility that, in reality, the subscriber will not receive the data because of reasons such as cases when the mobile telephone terminal of the subscriber is not powered on at the time of data distribution, and when the terminal is not in the distribution area.

Moreover, since the volume of the data to be distributed varies widely, there is a possibility that the subscriber will not receive as much data as matches the monthly fixed-rate charge, or on the contrary will receive excessive data to the standard rate of data billing.

Further, from the viewpoint of the communications carriers, the range of the billing target has been narrowed because only monthly fixed-rate service billing to subscribers and the billing to content providers can be realized.

SUMMARY OF THE INVENTION

It is an exemplary object of the invention to provide a billing system in which the billing corresponds to the amount of received data when providing a broadcast service, a billing-information generation apparatus, a billing-information generation method, and a computer readable recording medium which records a billing-information generation program.

The billing system according to an exemplary aspect of the invention is a billing system for distributing information by a broadcast service which transmits the same data to mobile terminals from an information distribution apparatus via a network, wherein the billing system is connected with an information distribution apparatus, a billing-information generation apparatus, and a mobile terminal via a network, wherein the information distribution apparatus comprises: a data creation unit which creates data to be simultaneously distributed and further adds to the data an identifier, which indicates that the data is distributed by a broadcast service, and adds billing class information in accordance with the data amount; and a transmission/reception unit for transmitting the data, to which the identifier has been added, and to which the billing class information has been added, to the mobile terminal, wherein the mobile terminal comprises: a transmission/reception unit for receiving the data transmitted from the information distribution apparatus and for transmitting a reception confirmation message to the billing-information generation apparatus and the information distribution apparatus; and a reception-confirmation-message creation unit for creating the reception confirmation message if it is determined from the identifier added to the received data that the received data has been distributed by a broadcast service, and for further adding thereto the identifier and billing class information which have been added to the data, and wherein the billing-information generation apparatus comprises: a billing-information generation unit for generating billing information based on the billing class information added to the reception confirmation message if it is determined from the identifier added to the reception confirmation message transmitted from the mobile terminal that the received data has been distributed by a broadcast service.

The billing-information generation apparatus according to an exemplary aspect of the invention is a billing-information generation apparatus for making up a billing system for distributing information by a broadcast service which transmits same data to mobile terminals from an information distribution apparatus via a network, wherein the billing-information generation apparatus comprises: a billing-information generation unit for receiving a reception confirmation message, which is created by having added to it a notification that the mobile terminal has received the data transmitted from the information distribution apparatus, and the identifier and the billing class information which are added to the received data by the information distribution apparatus, from the mobile terminal, and for generating billing information based on the billing class information added to the reception confirmation message if it is determined from the identifier added to the reception confirmation message that the received data has been distributed by a broadcast service.

The method of generating billing information according to an exemplary aspect of the invention is a method of generating billing information by a billing-information generation apparatus for making up a billing system for distributing information by a broadcast service which transmits same data to mobile terminals from an information distribution apparatus via a network, wherein the method of generating billing information comprises: receiving a reception confirmation message, which is created by having added to it a notification that the mobile terminal has received the data transmitted from the information distribution apparatus, and the identifier and the billing class information which are added to the received data by the information distribution apparatus, from the mobile terminal, and generating billing information based on the billing class information added to the reception confirmation message if it is determined from the identifier added to the reception confirmation message that the received data has been distributed by a broadcast service.

The computer readable recording medium which records the billing-information generation program according to an exemplary aspect of the invention is a computer readable recording medium which records a billing-information generation program based on a billing-information generation apparatus for making up a billing system for distributing information by a broadcast service which transmits same data to mobile terminals from an information distribution apparatus via a network, wherein the computer readable recording medium records: a billing-information generation program for causing a computer to perform processing to receive a reception confirmation message, which is created by having added to it a notification that the mobile terminal has received the data transmitted from the information distribution apparatus, and the identifier and the billing class information which are added to the received data by the information distribution apparatus, from the mobile terminal, and to generate billing information based on the billing class information added to the reception confirmation message if it is determined from the identifier added to the reception confirmation message that the received data has been distributed by a broadcast service.

The above and other objects, features and advantages of the present invention will become apparent with reference to the accompanying drawings which illustrate examples of the present invention.

BRIEF DESCRIPTION OF THE DRAWINGS

FIG. 2 illustrates the operational processing of a billing system relating to an exemplary embodiment.

DETAILED DESCRIPTION OF THE EXEMPLARY EMBODIMENTS

Figure 1:
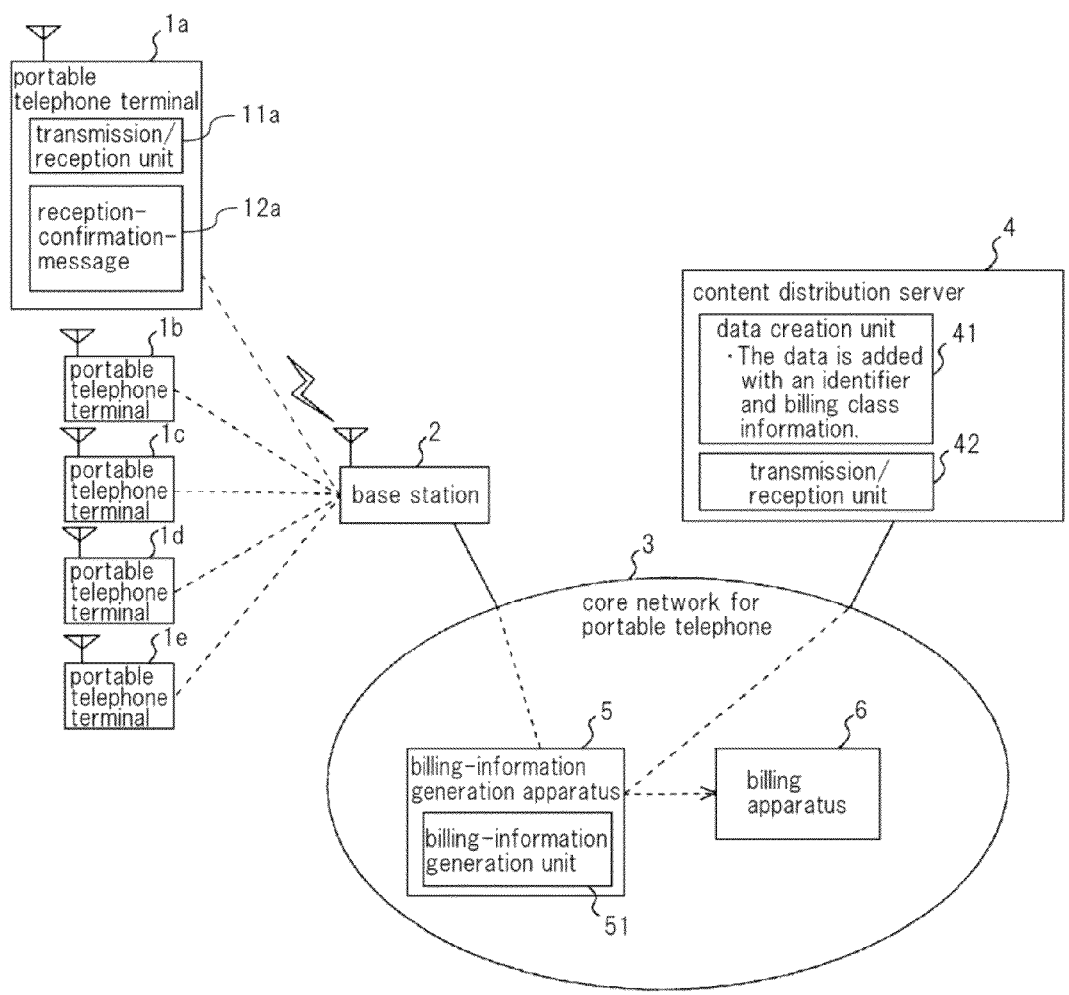
FIG. 1 is a general schematic diagram of a billing system relating to an exemplary embodiment.

Hereafter, exemplary embodiments will be described in detail with reference to the drawings. Moreover, in the exemplary embodiments described below, description will be made by using a portable telephone terminal as an example of the mobile terminal.

[Configuration]

FIG. 1 is a general schematic diagram to show a billing system relating to an exemplary embodiment. As shown in FIG. 1, the billing system is configured to include portable telephone terminals 1(*a* to *e*), base station 2, core network 3 for portable telephone network, and content distribution server 4.

Content distribution server 4 is configured to include data creation unit 41 and transmission/reception unit 42. Data creation unit 41 creates data to be broadcast. Transmission/reception unit 42 transmits the created data.

Core network 3 is a network including at least billing-information generation apparatus 5, and may be either wired or wireless. Billing-information generation apparatus 5 includes billing-information generation unit 51. Billing-information generation apparatus 5 enables performing the billing in accordance with the amount of data actually received by portable telephone terminal 1.

Portable telephone terminal 1*a* is configured to include at least transmission/reception unit 11*a* and reception-confirmation-message creation unit 12*a*. It is noted that other portable telephone terminals 1*b* to 1*e* have the same configuration, although they are omitted in FIG. 1.

Whether or not portable telephone terminals 1*a* to 1*e* receive the data simultaneously distributed from content distribution server 4 is determined by whether or not the portable telephone terminal is a model compatible with the broadcast service, when the user decides to subscribes to the broadcast service offered by content distribution server 4. In the portable telephone terminal used in the present exemplary embodiment, portable telephone terminals 1*a*, 1*b*, and 1*c* are assumed to be enabled to receive the broadcast service.

[Processing Operations]

Next, the processing operations relating to an exemplary embodiment will be described with reference to FIG. 2.

Content distribution server 4 creates data to be simultaneously distributed (A1). An identifier which indicates that, the data to be transmitted is data that has already been transmitted by simultaneous distribution, is added to the data to which billing class information in accordance with the data amount is added.

Content distribution server 4 performs the simultaneous distribution of the data (A2). The data will arrive at portable telephone terminal 1 via core network 3 and base station 2.

Upon receipt of data (A3), portable telephone terminal 1 can discriminate between the data which is to be simultaneously distributed and the data which is to be downloaded as the result of a request made by a subscriber to the network.

When it is determined that data is to be transmitted by simultaneous distribution (A4), a reception confirmation message is transmitted to content distribution server 4 which is the sender of the data (A5). The reception confirmation message is transmitted with the addition of an identifier which indicates that the data is to be simultaneously distributed and which has been added to the data received from the content server, with billing class information in accordance with the data amount being added to the received data.

The reception confirmation message arrives at content distribution server 4, which is the source of distribution, via base station 2 and core network 3 (A7). It is noted that when a large amount of the same data is transmitted by a broadcast service, a large amount of reception confirmation messages corresponding to the data will be transmitted as well, and there is a risk that exchanges such as SGSN (service GPRS (General Packet Radio Service) support node) included in core network 3 become overloaded. Therefore, possible countermeasures are (1) to provide time difference for each portable telephone terminal to cause the reception confirmation messages to be spread out, (2) to receive reception confirmation messages for every multiple RNC (Radio Network Controller, which is a base station control apparatus also referred to as BSC (Base Station Controller)) included in SGSN, and (3) to add load state information of SGSN at the time when the broadcast data passes through SGSN so that each portable telephone terminal transmits a reception confirmation message while in a temporary standby state taking into account of the load state information.

Here, billing-information generation apparatus 5 captures the reception confirmation information transmitted from portable telephone terminal 1 when passing through core network 3 (A6).

Billing-information generation apparatus 5 determines the generation of billing information for simultaneous distribution of data by confirming the identifier that was added to the reception confirmation message. The billing information is created with reference to the billing class information added to the reception confirmation message (A8). It is noted that the created billing information is transferred to, for example, billing apparatus 6 (A9). Billing apparatus 6 is an example of the apparatus with which the communications carriers collect and calculate the billing information. Any alternate way will do, provided that the communications carriers can keep track of the reception of broadcast data by portable telephone terminal 1, and the billing information that corresponds to the amount of data that has been received.

It is noted that the reception confirmation message transmitted to content distribution server 4 may be discarded when a fixed time elapses or when the volume of the reception confirmation messages reaches a fixed amount (A10).

In the exemplary embodiment, since portable telephone terminals 1a, 1b, and 1c of portable telephone terminals 1a to 1e are allowed to receive a broadcast service, for example, when terminal 1c can not receive the data by the broadcast service for some reason and only portable telephone terminals 1a and 1b can receive it, reception confirmation messages are transmitted from portable telephone terminals 1a and 1b. As a result of this, it is possible to perform billing that corresponds to the data amount only to portable telephone terminals 1a and 1b which have successfully received the data.

According to the above exemplary embodiment, the communications carriers can perform billing that corresponds to the data amount of the data actually received by the portable telephone terminals which subscribe to the broadcast service. The communications carriers can also combine conventional monthly fixed-rate billing therewith. This will lead to increased profits for the communications carriers.

Moreover, since reception confirmation messages are transmitted to content distribution server 4, it is possible to keep track of the number of the subscribers who actually read the data which is sent out simultaneously. As a result, the range of the advertisement charges that can be set will be increased. Further, an audience rate can be calculated that applies to the entire populations that is the target for receiving the simultaneously distributed data.

Further, as a result of the realization of the billing that corresponds to the data amount, it becomes possible to avoid a case where a portable telephone terminal is billed without regard to the actual outcome in which the telephone terminal does not receive any data, thus providing a billing method more suitable for the subscriber side as well.

Further, as the simultaneous distribution for mobile terminals, there are CBS (Cell Broadcast Service) which distributes texts, MBMS (Multimedia Broadcast/Multicast Service: specified in 3GPP) which distributes multimedia contents, BCMCS (BroadCast/MultiCast Service: specified in 3GPP-2) and the like, the exemplary embodiment will be effective for use in MBMS and BCMCS which mainly enables perform the distribution of a large volume of contents.

Other exemplary embodiments include an application to the case in which simultaneous distribution of data using a packet is performed even when the distribution destination is information processing apparatuses such as personal computers, and the like. Moreover, applications in multimedia information are possible.

It is noted that although portable telephone terminals 1a to 1e are used in FIG. 1, the present invention is applicable when performing the distribution to a large number of unspecified terminals.

It is noted that the program for a CPU to perform the processing operations of the above described exemplary embodiment makes up the program according to the present invention. As the recording medium for recording this program, a semiconductor storage unit and an optical and/or magnetic storage unit etc. may be used. By using such a program and recording medium in a system which has a different configuration from the above described respective exemplary embodiment, and by causing the CPU therein to perform the above described program, it is possible to achieve the same effects as those of the present invention.

While the invention has been particularly shown and described with reference to exemplary embodiments thereof, the invention is not limited to these embodiments. It will be understood by those of ordinary skill in the art that various changes in form and details may be made therein without departing from the scope and spirit of the present invention as defined by the claims.

What is claimed is:

1. A billing system for distributing information by a broadcast service, comprising:
mobile terminals;
an information distribution apparatus; and
a billing-information generation apparatus, wherein
said mobile terminals, said information distribution apparatus, and said billing-information generation apparatus are connected to one another via a network,
said information distribution apparatus comprises:
a data creation unit which creates data to be simultaneously distributed and further adds to said data an identifier, which indicates that said data is to be distributed by the broadcast service, and adds billing class information in accordance with a data amount; and
a transmission/reception unit for transmitting said data, to which said identifier has been added, and to which said billing class information has been added, to said mobile terminal, wherein
said mobile terminal comprises:
a transmission/reception unit for receiving the data transmitted from said information distribution apparatus and for transmitting a reception confirmation message to said billing-information generation apparatus and said information distribution apparatus; and
a reception-confirmation-message creation unit for creating said reception confirmation message if it is determined from said identifier added to said received data that said received data has been distributed by the broadcast service, and for further adding thereto the identifier and billing class information which have been added to said data, and wherein
said billing-information generation apparatus comprises:
a billing-information generation unit for generating billing information based on the billing class information added to the said reception confirmation message, if it is determined from said identifier added to the reception confirmation message transmitted from said mobile terminal that said received data has been distributed by the broadcast service,
wherein
said mobile terminal determines said received data as being multicast data of the broadcast service or other data, and sends the reception confirmation message on which basis billing is performed only when said mobile terminal determines that said received data is said multicast data of the broadcast service and not said other data, such that said reception confirmation message is not sent by said mobile terminal when said mobile terminal determines that said received data is said other data and not said multicast data of the broadcast service,
said reception confirmation message is added with load state information of a base station through which said data is passed while being transmitted from said information distribution apparatus to said mobile terminal, and
the transmission/reception unit provided in said mobile terminal transmits said reception confirmation message after being in a temporary standby state in response to said load state information.

2. A billing system for distributing information by a broadcast service, comprising:

mobile terminals;
an information distribution apparatus; and
a billing-information generation apparatus, wherein
said mobile terminals, said information distribution apparatus, and said billing-information generation apparatus are connected to one another via a network, said information distribution apparatus comprises:
data creation means which creates data to be simultaneously distributed and further adds to said data an identifier, which indicates that said data is to be distributed by the broadcast service, and billing class information in accordance with a data amount; and
transmission/reception means for transmitting said data, to which said identifier has been added, and to which said billing class information has been added, to said mobile terminal, wherein
said mobile terminal comprises:
transmission/reception means for receiving the data transmitted from said information distribution apparatus and transmitting a reception confirmation message to said billing-information generation apparatus and said information distribution apparatus; and
reception-confirmation-message creation means for creating said reception confirmation message if it is determined from said identifier added to said received data that said received data has been distributed by the broadcast service, and further adding thereto the identifier and billing class information which have been added to said data, and wherein
said billing-information generation apparatus comprises:
billing-information generation means for generating billing information based on the billing class information added to the said reception confirmation message, if it is determined from said identifier added to the reception confirmation message transmitted from said mobile terminal that said received data has been distributed by the broadcast service,
wherein
said mobile terminal determines said received data as being multicast data of the broadcast service or other data, and sends the reception confirmation message on which basis billing is performed only when said mobile terminal determines that said received data is said multicast data of the broadcast service and not said other data, such that said the reception confirmation message is not sent by said mobile terminal when said mobile terminal determines that said received data is said other data and not said multicast data of the broadcast service,
said reception confirmation message is added with load state information of a base station through which the data is passed while being transmitted from said information distribution apparatus to said mobile terminal, and
the transmission/reception means provided in said mobile terminal transmits said reception confirmation message after being in a temporary standby state in response to said load state information.

3. A billing-information generation apparatus operable in a billing system for distributing information by a broadcast service which transmits same data to mobile terminals from an information distribution apparatus via a network, wherein said billing-information generation apparatus comprises:
hardware;
a billing-information generation unit implemented at least by the hardware for receiving a reception confirmation message, which is created by having added to it a notification that said mobile terminal has received data transmitted from said information distribution apparatus, and an identifier and a billing class information which are added to said received data by said information distribution apparatus, from said mobile terminal, and for generating billing information based on the billing class information added to said reception confirmation message if it is determined, from said identifier added to said reception confirmation message, that the received data has been distributed by the broadcast service,
wherein
said mobile terminal determines said received data as being multicast data of the broadcast service or other data, and sends the reception confirmation message on which basis billing is performed only when said mobile terminal determines that said received data is said multicast data of the broadcast service and not said other data, such that said reception confirmation message is not sent by said mobile terminal when said mobile terminal determines that said received data is said other data and not said multicast data of the broadcast service,
said reception confirmation message is added with load state information of a base station through which the data is passed while being transmitted from said information distribution apparatus to said mobile terminal, and
a transmission/reception unit provided in said mobile terminal transmits said reception confirmation message after being in a temporary standby state in response to said load state information.

4. A billing-information generation apparatus operable in a billing system while distributing information by a broadcast service which transmits same data to mobile terminals from an information distribution apparatus via a network, wherein said billing-information generation apparatus comprises:
billing-information generation means implemented at least by hardware for receiving a reception confirmation message, which is created by being added with a notification that said mobile terminal has received data transmitted from said information distribution apparatus, and an identifier and a billing class information which are added to said received data by said information distribution apparatus, from said mobile terminal, and generating billing information based on the billing class information added to said reception confirmation message if it is found, from said identifier added to said reception confirmation message, that the received data is distributed by the broadcast service,
wherein
said mobile terminal determines said received data as being multicast data of the broadcast service or other data, and sends the reception confirmation message on which basis billing is performed only when said mobile terminal determines that said received data is said multicast data of the broadcast service and not said other data, such that said reception confirmation message is not sent by said mobile terminal when said mobile terminal determines that said received data is said other data and not said multicast data of the broadcast service,
said reception confirmation message is added with load state information of a base station through which the data is passed while being transmitted from said information distribution apparatus to said mobile terminal, and a transmission/reception means provided in said mobile terminal transmits said reception confirmation message after being in a temporary standby state in response to said load state information.

5. A method of generating billing information by a billing-information generation apparatus operable in a billing system for distributing information by a broadcast service which transmits same data to mobile terminals from an information distribution apparatus via a network, wherein said method of generating billing information comprises:

receiving a reception confirmation message, by the billing-information generation apparatus that is implemented at least in hardware, which is created by having added to it a notification that said mobile terminal has received data transmitted from said information distribution apparatus, and an identifier and an billing class information which are added to said received data by said information distribution apparatus, from said mobile terminal, and generating billing information, by the billing-information generation apparatus, based on the billing class information added to said reception confirmation message if it is determined, from said identifier added to said reception confirmation message, that the received data has been distributed by the broadcast service, wherein said mobile terminal determines said received data as being multicast data of the broadcast service or other data, and sends the reception confirmation message on which basis billing is performed only when said mobile terminal determines that said received data is said multicast data of the broadcast service and not said other data, such that said reception confirmation message is not sent by said mobile terminal when said mobile terminal determines that said received data is said other data and not said multicast data of the broadcast service, said reception confirmation message is added with load state information of a base station through which the data is passed while being transmitted from said information distribution apparatus to said mobile terminal, and a transmission/reception unit provided in said mobile terminal transmits said reception confirmation message after being in a temporary standby state in response to said load state information.

6. A non-transitory, tangible computer readable recording medium which records a billing-information generation program executable by hardware of a billing-information generation apparatus operable in a billing system for distributing information by a broadcast service which transmits same data to mobile terminals from an information distribution apparatus via a network, wherein said billing-information generation program causes said billing-information generation apparatus to perform a method comprising:

receiving a reception confirmation message, which is created by having added to it a notification that said mobile terminal has received data transmitted from said information distribution apparatus, and an identifier and an billing class information which are added to said received data by said information distribution apparatus, from said mobile terminal, and generating billing information, based on the billing class information added to said reception confirmation message if it is determined, from said identifier added to said reception confirmation message, that the received data has been distributed by the broadcast service, wherein said mobile terminal determines said received data as being multicast data of the broadcast service or other data, and sends the reception confirmation message on which basis billing is performed only when said mobile terminal determines that said received data is said multicast data of the broadcast service and not said other data, such that said reception confirmation message is not sent by said mobile terminal when said mobile terminal determines that said received data is said other data and not said multicast data of the broadcast service, said reception confirmation message is added with load state information of a base station through which the data is passed while being transmitted from said information distribution apparatus to said mobile terminal, and a transmission/reception unit provided in said mobile terminal transmits said reception confirmation message after being in a temporary standby state in response to said load state information.

* * * * *